US012808246B2

(12) United States Patent
Bähr et al.

(10) Patent No.: US 12,808,246 B2
(45) Date of Patent: Nov. 24, 2026

(54) HINGE FOR A LUGGAGE COMPARTMENT

(71) Applicant: SFS Group International AG, Heerbrugg (CH)

(72) Inventors: Dominik Bähr, Ammerbuch (DE); Olav Schendel, Stuttgart (DE); Markus Rottler, Ebhausen (DE)

(73) Assignee: SFS Group International AG, Heerbrugg (CH)

( * ) Notice: Subject to any disclaimer, the term of this patent is extended or adjusted under 35 U.S.C. 154(b) by 8 days.

(21) Appl. No.: 19/218,873

(22) Filed: May 27, 2025

(65) Prior Publication Data

US 2025/0359640 A1 Nov. 27, 2025

(30) Foreign Application Priority Data

May 27, 2024 (EP) .................................... 24178331

(51) Int. Cl.

| | |
|---|---|
| ***E05F 3/20*** | (2006.01) |
| ***E05F 1/12*** | (2006.01) |
| ***E05F 3/14*** | (2006.01) |
| *E05D 3/02* | (2006.01) |

(52) U.S. Cl.

CPC ............. *E05F 3/20* (2013.01); *E05F 1/1215* (2013.01); *E05F 3/14* (2013.01); *E05D 3/02* (2013.01); *E05Y 2201/499* (2024.05); *E05Y 2900/538* (2013.01)

(58) Field of Classification Search

CPC ........ A45C 13/007; E05F 3/20; E05F 1/1215; E05F 3/14; E05Y 2900/538; E05Y 2201/224; E05Y 2201/499; E05D 3/02

See application file for complete search history.

(56) References Cited

U.S. PATENT DOCUMENTS 3,825,973 A * 7/1974 Gwozdz ................ E05F 1/1215 16/300
3,965,533 A * 6/1976 Frohlich ............... E05F 1/1215 16/72

(Continued)

FOREIGN PATENT DOCUMENTS

CN 203905696 U 10/2014
DE 202007014471 U1 3/2009

(Continued)

*Primary Examiner* — Jeffrey O'Brien
(74) *Attorney, Agent, or Firm* — Volpe Koenig

(57) ABSTRACT

A luggage compartment hinge having a first hinge leaf with one bearing bush arranged between two second hinge leaf bushes. In an axle tube, non-rotatably connected to the first hinge leaf bush and rotatable in the second hinge leaf bearing bushes, there is a torsion spring, fastened at its first end to the axle tube and at its second end to a pretensioning adjusting element. A pivoting-movement damping element is arranged between the first and second hinge leaves. The adjusting element includes: a latching element in the second hinge leaf second bush with a ratchet wheel having an outer gear rim; a locking pawl mounted on the second bush for engagement in the outer gear rim; and a stop element which limits the rotation angle of the adjusting element. This arrangement allows the locking effect of the locking pawl to be ensured even without axial pretensioning of the torsion spring.

11 Claims, 2 Drawing Sheets

(56) References Cited

U.S. PATENT DOCUMENTS

| | | | | |
|---|---|---|---|---|
| 4,073,038 | A * | 2/1978 | Curry | E05F 1/1215 16/50 |
| 6,148,480 | A * | 11/2000 | Cooke | H04M 1/0216 16/326 |
| 7,210,199 | B2 * | 5/2007 | Clark | E05D 5/06 16/319 |
| 8,266,764 | B2 * | 9/2012 | Costabel | E05F 1/1207 188/290 |
| 8,549,707 | B2 * | 10/2013 | Macernis | E05F 1/1215 16/50 |
| 10,392,843 | B2 * | 8/2019 | Liu | E05D 11/0081 |
| 10,890,023 | B2 * | 1/2021 | Mccafferty | E05D 7/14 |
| 12,180,773 | B2 * | 12/2024 | Xue | E05D 3/02 |
| 12,385,307 | B2 * | 8/2025 | Liu | E05F 1/1215 |
| 12,612,813 | B2 * | 4/2026 | Liang | E05D 3/02 |
| 12,618,274 | B2 * | 5/2026 | Liang | E05D 3/02 |
| 12,624,584 | B1 * | 5/2026 | Timothy | E05F 1/1215 |
| 2002/0078529 | A1 * | 6/2002 | Schwarz | E05F 3/20 16/387 |
| 2011/0185536 | A1 * | 8/2011 | Costabel | E05F 1/1207 16/2.1 |
| 2013/0081228 | A1 * | 4/2013 | Janak | E05F 3/12 16/319 |
| 2021/0207417 | A1 * | 7/2021 | Koo | E05F 1/1215 |
| 2021/0293270 | A1 * | 9/2021 | Zhu | F16C 11/04 |
| 2024/0254819 | A1 * | 8/2024 | Bruchu | E05F 1/1008 |

FOREIGN PATENT DOCUMENTS

| | | | |
|---|---|---|---|
| EP | 1217158 | A2 | 6/2002 |
| EP | 0894933 | B1 | 11/2005 |
| JP | 2000257330 | A | 9/2000 |

* cited by examiner

HINGE FOR A LUGGAGE COMPARTMENT

CROSS-REFERENCE TO RELATED APPLICATIONS

This application claims priority to European Patent-application Ser. No. 24/178,331.5, filed May 27, 2024, which is incorporated herein by reference as if fully set forth.

TECHNICAL FIELD

The present invention relates to a damped, power-assisted hinge, in particular for use in vehicles and aircraft.

BACKGROUND

Luggage compartments, especially in aircraft, are highly stressed components and represent a technical challenge for aircraft cabin outfitters. The space available in the cabin should be optimally utilized, handling should be easy and the opening and closing behavior must meet the requirements when changing passengers. The following section looks at overhead compartments, which are usually designed as a container permanently installed in the cabin ceiling with a flap for opening and closing. The flap is attached to the overhead locker by means of two hinges. A separate locking mechanism locks the flap so that no pieces of luggage can fall out of the luggage compartment. Both the hinges and the locking mechanism must meet high safety requirements in order to ensure safety even in the event of overloading, improper operation and demanding flight situations. It is known to mechanically support the opening movement of the flap after unlocking. It is also known to dampen this opening movement so that the flap does not spring up in an uncontrolled manner.

DESCRIPTION OF THE PRIOR ART

In the prior art, a large number of documents are available on luggage storage compartments that can be closed with flaps, especially for aircraft.

EP 0 894 933 A2 describes a hinge with a device for supporting the opening movement and a device for simultaneously damping this opening movement. The components for this are compactly concentrated in the hinge. The damping is designed in such a way that the speed of movement of the flap decreases as the opening angle increases. The opening movement is supported by one or two pretensioned torsion spring(s).

EP 1 217 158 A2 describes a hinge with a fixed and a movable hinge leaf, which have a hinge axis designed as a hollow axle. A torsion spring is arranged in the hollow axle to support the opening movement.

The specification DE 20 2007 014 471 U1 shows a hinge for a luggage compartment having a torsion spring as the drive for the opening movement. The pretension for the torsion spring is set by turning a component which is inserted into one end of the hollow axle and receives one end of the spring on one side and has an external toothing on a pin on the other side. Once the desired pretension has been achieved, a retaining ring is inserted into the hollow axle, which engages on the inside with the external toothing of the pin and locks on the outside with the internal toothing of the hollow axle provided for this purpose. This defines the position of the component relative to the hollow axle.

US 2013/081228 A1 describes a pivoting hinge with fluid damping for luggage compartments.

SUMMARY

It is the object of the present invention to further develop the prior art, in particular to improve the handling and safety of luggage compartments in vehicles and aircraft.

This object is solved by a hinge having one or more of the features described herein. Further variants and exemplary embodiments are described below and in the claims.

Unless otherwise stated, the following disclosure describes a hinge in a functional configuration. The hinge(s) is/are attached to the top of the luggage compartment lid, so the lid always opens upwards against gravity.

A hinge for the above-mentioned applications as a luggage compartment basically comprises two hinge leaves, wherein the first hinge leaf has a bearing bush. The second hinge leaf has a first and a spaced second bearing bush, which are arranged coaxially (aligned). The bearing bush of the first hinge leaf is arranged between the bearing bushes of the second hinge leaf so that it can rotate about a common hinge axis.

Furthermore, the hinge comprises an axle tube which is non-rotatably connected to the bearing bush of the first hinge leaf and is rotatably mounted in the bearing bushes of the second hinge leaf. A torsion spring is located in the axle tube, the first end of which is attached to the axle tube and the second end of which is connected to an adjusting element for pretensioning the torsion spring.

Furthermore, the hinge has a damping element for its pivoting movement, which on the one hand is arranged in the first bearing bush of the second hinge leaf to prevent it from rotating and on the other hand is connected to the axle tube.

The aforementioned adjusting element is used to pretension the torsion spring and essentially comprises three elements:

A) a latching element arranged in the second bearing bush of the second hinge leaf with a ratchet wheel having an outer gear rim. B) a locking pawl mounted on the second bearing bush for engagement in the outer gear rim of the ratchet wheel and C) a stop element which limits the angle of rotation range $\alpha$ of the adjusting element.

The arrangement of torsion spring, locking pawl and ratchet wheel allows the locking effect of the locking pawl to be ensured even without axial pretensioning of the torsion spring. In particular, with this hinge it is not necessary to anchor the torsion spring in the axial direction in the axle tube or on the adjusting element in a tension-proof manner.

Torsion springs made of spring steel are often tensioned in the closing direction, i.e. twisted in the winding direction. In order to achieve the desired return torque. This inevitably increases the number of windings of the torsion spring, which in turn leads to a reduction in the diameter of the torsion spring due to the constant wire length, but at the same time increases its length. This means that a spring pretensioned in this way could move sideways in the axle tube due to its reduced outer diameter. However, if the torsion spring is pretensioned in the axial direction, the situation arises that the axial tension decreases with increasing torsion.

Therefore, in the present arrangement, the spring is twisted in the opening direction against the winding direction in order to ensure the torque required during operation. When the spring is tensioned by torsion against the winding direction, the spring becomes shorter and increases in diameter. This can be compensated for by dimensioning the axle tube accordingly. The advantage is that the spring ends can be arranged in corresponding receiving pockets or openings in the adjusting element or in the axle tube with axial longitudinal play and no pressure is generated in the axial direction.

Furthermore, the locking effect of the locking pawl can be supported by a spring which is arranged between the second bearing bush and the locking pawl in such a way that it counteracts a pivoting movement of the locking pawl out of engagement with the ratchet wheel. In the present arrangement, a compression spring is preferred.

The above-mentioned latching element for adjusting the torque of the torsion spring essentially comprises a ratchet wheel and a locking pawl. Such latching elements are known in the prior art in many designs. The ratchet wheel has a toothing (external toothing) on its outer contour, usually with a steep and a flat tooth flank in the manner of a saw tooth. The tip of the locking pawl can slide over the flat flank when turning forwards, while it hits the steep flank when attempting to turn backwards, forming a positive fit with it and preventing rotation.

The pawl tip is held against the ratchet piece in a force-fit (with spring force) perpendicular to the direction of movement of the ratchet piece. Depending on the geometric design of the tooth flanks, it is possible to force the locking pawl out of the ratchet wheel by applying a force against the locking spring. If—in an idealized view—the inhibiting tooth flank has an exact radial alignment, the friction of the contact surfaces between the locking pawl and the tooth flank must be overcome in addition to the force of the locking spring. It is clear from this that—in the present arrangement—the surface pressure between the ratchet wheel and the locking pawl caused by the spring torsion plays a role if the locking pawl is to be disengaged. It is therefore advantageous to reduce this surface pressure by turning the ratchet wheel slightly against the ratchet direction and thus relieving the locking pawl.

This relief step is particularly necessary if the inhibiting tooth flank is inclined in the locking direction and the locking pawl is therefore in a kind of pocket in the gear rim.

As is clear from the functional principle described, the locking effect of the locking pawl is guaranteed without axial pretensioning of the torsion spring. This advantage is particularly important in comparison to face-toothed latching elements, which are dependent on a minimum axial tensile stress to ensure their locking effect.

A further feature of the invention is that the stop element has a stop disk with a limiter in the form of a circular ring sector pointing radially outwards, which rotates with the adjusting element, and uses a stop pin mounted in the second bearing bush so that it cannot rotate. In conjunction with the stop pin, the limiter thus prevents the torsion spring from being pretensioned beyond the range specified by the two stops. Looking at the associated figure, it is clear to the person skilled in the art that the characteristics of the torsion spring can be matched by simply adjusting the area of the circular ring sector or the angle range. In this way, this functional principle can be varied with a harder or softer torsion spring and an adjusting element with an adapted stop element.

The angular range $\alpha$ of the limiter is advantageously selected so that the first end of the circular ring sector forms the stop for the target torque in the "open" state of the hinge. The second end of the circular ring sector forms the stop for an overtorque protection of the torsion spring. The purpose of this definition becomes clear below:

The adjusting element can be adjusted according to the following pattern: The individual components, as shown in FIG. 1 for example, are assembled to form a hinge in the "open" position. The basic setting for the spring tension is adjusted so that the torque achieved by the torsion spring corresponds to the specified torque in the "open" or "hold open" position. The latching element is then connected to the bearing bush in a torque-locking manner and the locking pawl is inserted. The alignment of the stop disk is selected so that a locking pin, which extends through the bearing bush into the effective range of the limiter, is positioned near or at the first stop of the circular ring sector. This device is also referred to as the factory setting.

If the locking pawl is now released, the torsion spring can rotate back to the factory setting at the first stop. The second stop is reached after a defined number of latching clicks when the latching element is turned forwards and then prevents the user from overtightening the torsion spring and thus damaging or destroying it. With each click, the torsion spring is pretensioned more and the restoring torque, which helps to open the luggage compartment flap, increases. This means that a hinge—within the limits set by the spring torsion—can be used for luggage compartment flaps of different weights. The countable latching clicks serve as a guide for the adjuster as to how far the hinge has already been pretensioned. Alternatively, he can use a torque wrench, which is inserted into the internal handle for the tool on the latching element.

If he makes a mistake with the clicks or selects the wrong torque, he can unlock the locking pawl by inserting an unlocking pin through the unlocking opening in the second bearing bush. The hinge can then be reset to the factory setting.

These adjustment instructions are exemplary, but not the only possible ones. However, a person skilled in the art can take the objectives and a procedure logic from it that allows him an alternative sequence with the same result.

Advantageously, the stop disk can be manufactured as an integral part of the adjusting element. Preferably, the adjusting element can be manufactured as an injection-molded plastic part. Additives such as fibers can be added to increase the strength. The ratchet wheel can also be manufactured as an integral part of the adjusting element.

Furthermore, the damping element can be designed in such a way that the damping decreases as the hinge opens. As can be seen from the adjustment instructions above, the hinge is pretensioned in the "open" position. This means that when the luggage compartment flap is closed, the torsion spring is tensioned even further. This specification is made to exclude half-opened or half-opening flaps in everyday use. Conversely, however, this also means that a (just closed) luggage compartment flap experiences the greatest torque immediately after unlocking; it could therefore spring up unexpectedly. The damping element therefore compensates for the torque most immediately after the flap is unlocked. The decreasing damping ensures that the greater the opening angle, the weaker the damping of the damper when opening. Ideally, the characteristic curve is adjusted so that the speed of the opening movement is essentially uniform.

An unlocking opening can be provided on the housing of the second bearing bush, through which the locking pawl can be unlocked using an inserted tool. This realization is inconspicuous and yet easily accessible. As described above, the locking pawl usually needs to be relieved.

A luggage compartment for an aircraft or vehicle according to the present disclosure thus comprises a container for holding objects with an opening that can be closed by a flap.

The connection between the container and the flap is realized by at least two hinges as described above. The adjustment option with audible clicks then allows both hinges to be easily set to the same opening and closing characteristics.

BRIEF DESCRIPTION OF THE FIGURES

The invention will now be explained by way of example with reference to the accompanying drawings, using particularly preferred embodiments.

DETAILED DESCRIPTION

Figure 1:
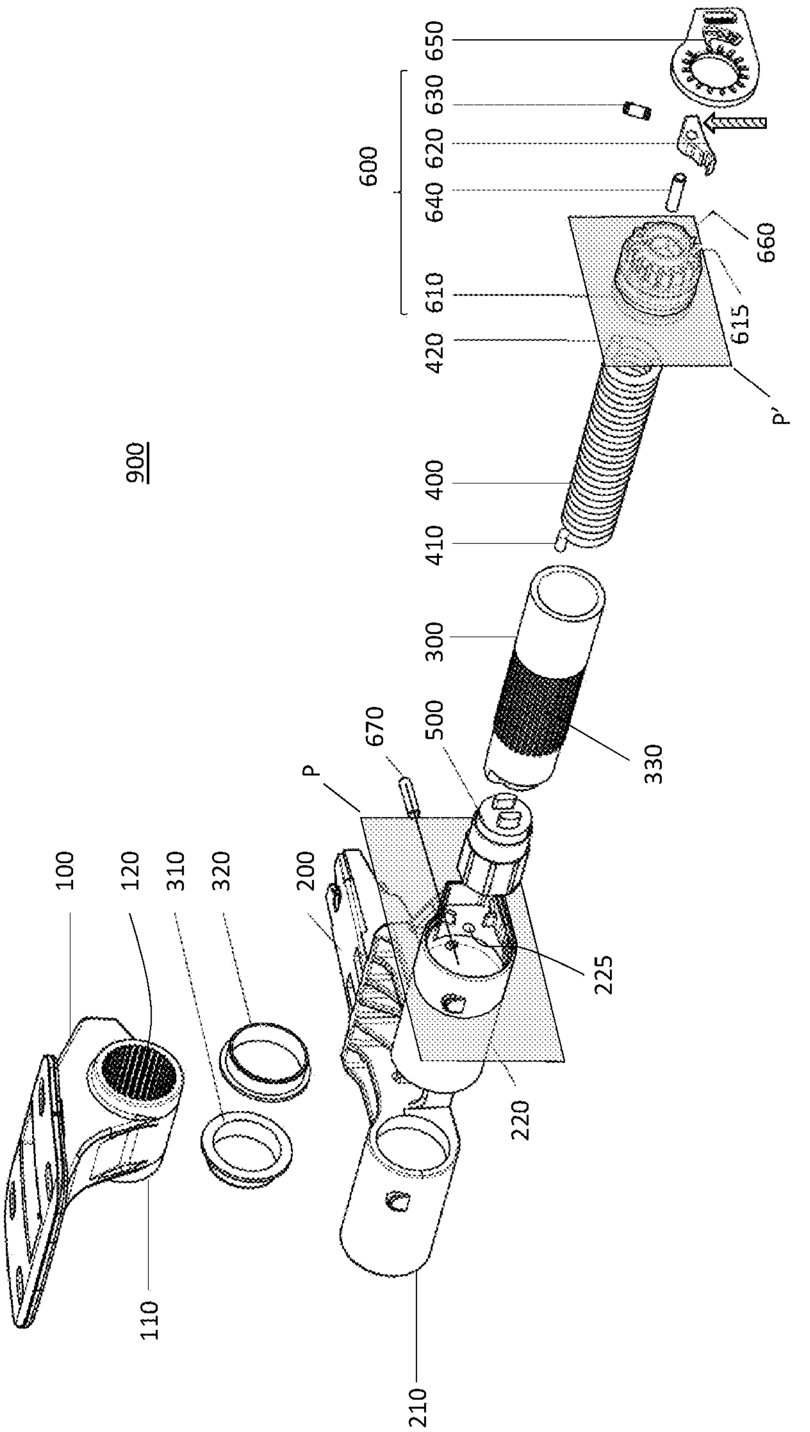
FIG. 1 shows an exploded view of an embodiment of the invention.

FIG. 1 shows the exploded assembly of components of a hinge according to this description. Reference signs 100 and 200 denote the first and second hinge leaves, respectively, wherein the first hinge leaf 100 has a bearing bush 110 which is to be arranged between the two bearing bushes 210 and 220 of the second hinge leaf 200. Reference signs 310 and 320 denote bearing shells which can be inserted into the bearing bushes 210 and 220 and may have friction-reducing properties. The axle tube 300 is a central connecting element with an outer contour 330 that can be inserted into the bearing bush 110 with a corresponding inner contour 120 in a rotationally secure manner. A torsion spring 400 is inserted into the axle tube 300, the first end 410 of which may be a loop or a pin-shaped end, depending on the design of the wire end. The anchoring in the axle tube 300 can then be achieved, for example, in a slot or by inserting the wire end into a corresponding simple opening (not shown in the figure). The absence of axial clamping under tension greatly simplifies the assembly of the hinge.

The axle tube is connected to a damping element 500 in a torque-locking manner, e.g. by inserting corresponding surface structures into each other. The damping element 500 in turn has an outer contour that allows it to be inserted into the first bearing bush in a variety of angular positions and anchored there. The second end 420 of the torsion spring 400 can be inserted into an adjusting element 600 similar to the anchoring in the axle tube 300. The adjusting element 600, which is integrally formed in a body, comprises a latching element 610 and a ratchet wheel 615 with a gear tooth outer contour.

The pawl 620 is provided to engage in the ratchet wheel 615 and is mounted so as to be pivotable about an axis which is formed by an axle pin 640. A spring, in this case a compression spring 630, secures the position of the locking pawl 620 when it engages in the ratchet wheel 615.

The indicated planes P and P' coincide after assembly of the hinge parts. This also makes it clear that the axle pin 640 is accommodated in the side cheek of the second bearing bush 220 in the bearing opening 225. The compression spring 630 is located between the outer lever arm of the locking pawl 620 and the housing of the bearing bush 220. Reference sign 660 indicates the internal engagement (here: hexagonal recess) for a rotary tool with which the latching element 610 can be rotated. An opening in the cover (lid 650) allows access to the internal engagement 660 even after the hinge has been assembled.

The arrow below the locking pawl indicates the direction in which a tool should be used to unlock the locking pawl. The insertion opening in the housing of the bearing bush 220 is not visible in FIG. 1.

Figure 2:
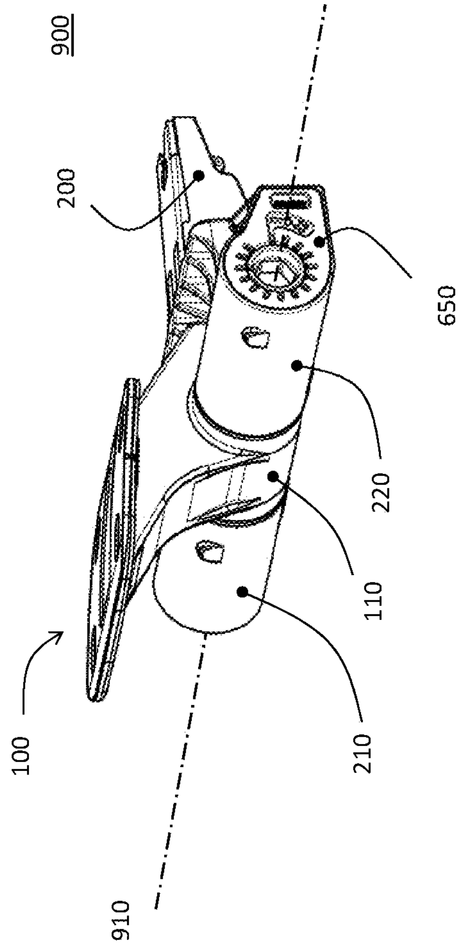
FIG. 2 shows a fully assembled variant of the same hinge.

FIG. 2 shows a hinge 900 according to the above disclosure in the assembled state in the "open" position. The reference signs describe the same components as in FIG. 1. The hinge axis is indicated by 910.

Figure 3:
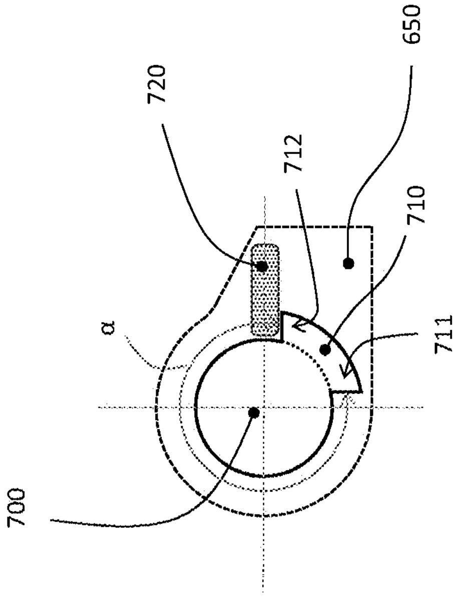
FIG. 3 shows a detail of the stop disk.

FIG. 3 is a functional diagram of a stop disk 700 with the circular sector-shaped limiter 710. Its stop surfaces 711 and 712 are shown as examples and represent only one of several possible designs. The stop pin 720 is shown in contact with surface 712. The contour of the cover 650 is indicated by a dashed line for orientation purposes.

The invention claimed is:

1. A hinge (900) for a luggage compartment, comprising:

a first hinge leaf and a second hinge leaf (100, 200), wherein
  the first hinge leaf (100) has a bearing bush (110),
  the second hinge leaf (200) has a first bearing bush (210) and a second bearing bush (220), spaced apart from and arranged coaxially with the first bearing bush (210), between which the bearing bush (110) of the first hinge leaf (100) is arranged and rotatable about a common hinge axis (910);

an axle tube (300) non-rotatably connected to the bearing bush (110) of the first hinge leaf (100) and rotatably mounted in the first and second bearing bushes (210, 220) of the second hinge leaf (200);

a torsion spring (400) arranged in the axle tube and having a first end (410) attached to the axle tube and a second end (420) connected to an adjusting element (600) for pretensioning the torsion spring (400);

a damping element (500) for damping a pivoting movement of the hinge, which is non-rotatably arranged in the first bearing bush (210) of the second hinge leaf (200) and is connected to the axle tube (300);

the adjusting element (600) comprises, for pretensioning the torsion spring (400),
  a) a latching element (610) arranged in the second bearing bush of the second hinge leaf (200) with a ratchet wheel (615) having an outer gear rim,
  b) a locking pawl (620) mounted on the second bearing bush for engagement with the outer gear rim of the ratchet wheel (615), and
  c) a stop element that limits an angular rotation range (a) of the adjusting element (600);

wherein a locking effect of the locking pawl (620) is ensured without axial pretensioning of the torsion spring (400).

2. The hinge according to claim 1, further comprising a spring (630) arranged between the second bearing bush (220) and the locking pawl (620) that supports the locking effect of the locking pawl (620) by counteracting a pivoting movement of the locking pawl out of engagement with the ratchet wheel (615).

3. The hinge according to claim 2, wherein the spring (630) is a compression spring.

4. The hinge according to claim 1, wherein the stop element comprises a stop disk (700) co-rotating with the adjusting element (600) and a limiter (710) comprising a radially outwardly pointing circular ring sector and a stop pin (720) mounted in the second bearing bush (220) in a rotationally fixed manner.

5. The hinge according to claim 4, wherein the angular rotation range (a) of the limiter (710) is selected so that the first end of the circular ring sector (710) forms a stop for the target torque in an open state of the hinge and the second end of the circular ring sector (720) forms a stop for an over-torque protection of the torsion spring.

6. The hinge according to claim 4, wherein the stop disk (700) is an integral part of the adjusting element (600).

7. The hinge according to claim 1, wherein the ratchet wheel (615) is an integral part of the adjusting element (600).

8. The hinge according to claim 1, wherein the damping element (500) acts such that the damping decreases as the opening of the hinge increases.

9. The hinge according to claim 1, wherein a characteristic curve of the damping element (500) is set such that a speed of the opening movement is essentially uniform.

10. The hinge according to claim 1, wherein an unlocking opening is provided in a housing of the second bearing bush (220), through which the locking pawl (620) in adapted to be unlocked via an inserted tool.

11. A luggage compartment for an aircraft or vehicle, comprising: a container for receiving objects, having an opening; a flap which is adapted to close the opening; and at least two hinges according to claim 1 connected between the container and the flap.

* * * * *